(12) United States Patent
Choi et al.

(10) Patent No.: US 10,595,037 B2
(45) Date of Patent: Mar. 17, 2020

(54) DYNAMIC SCENE PREDICTION WITH MULTIPLE INTERACTING AGENTS

(71) Applicant: NEC Laboratories America, Inc., Princeton, NJ (US)

(72) Inventors: Wongun Choi, Lexington, MA (US); Paul Vernaza, Sunnyvale, CA (US); Manmohan Chandraker, Santa Clara, CA (US); Namhoon Lee, Oxford (GB)

(73) Assignee: NEC Corporation (JP)

( * ) Notice: Subject to any disclaimer, the term of this patent is extended or adjusted under 35 U.S.C. 154(b) by 119 days.

(21) Appl. No.: 15/789,098

(22) Filed: Oct. 20, 2017

(65) Prior Publication Data

US 2018/0124423 A1    May 3, 2018

Related U.S. Application Data

(60) Provisional application No. 62/414,288, filed on Oct. 28, 2016, provisional application No. 62/418,442, filed on Nov. 7, 2016, provisional application No. 62/422,086, filed on Nov. 15, 2016.

(51) Int. Cl.
| | | |
|---|---|---|
| *H04N 7/18* | (2006.01) | |
| *H04N 19/52* | (2014.01) | |
| *G06T 7/277* | (2017.01) | |
| *G06N 3/08* | (2006.01) | |
| *G08B 13/00* | (2006.01) | |

(52) U.S. Cl.
CPC ............ *H04N 19/52* (2014.11); *G06N 3/08* (2013.01); *G06T 7/277* (2017.01); *G08B 13/00* (2013.01); *G06T 2207/30241* (2013.01)

(58) Field of Classification Search
CPC .................. H04N 19/52; G08B 13/00; G06T 2207/30241; G06T 2207/30196; G06T 2207/30232; G06K 9/00771; G06K 2209/27; G06K 9/00295; G06K 9/00342; G06K 9/00718; G06K 9/00778
USPC ........................................................ 348/152
See application file for complete search history.

(56) References Cited

U.S. PATENT DOCUMENTS

| 2008/0100704 A1* | 5/2008 | Venetianer | G06K 9/00771 348/143 |
| 2009/0296985 A1* | 12/2009 | Lv | G06T 7/285 382/103 |

OTHER PUBLICATIONS

Alexandre et al. (Social LSTM: Human Trajectory Prediction in Crowded Spaces, 2016 IEEE Conference on Computer Vision and Pattern Recognition (CVPR), Las Vegas, NV, Jun. 2016, pp. 961-971) (Year: 2016).*

Alexandre Alahi et al., Social LSTM: Human Trajectory Prediction in Crowded Spaces, 2016 IEEE Conference on Computer Vision and Pattern Recognition (CVPR), Las Vegas, NV, Jun. 2016, pp. 961-971.

(Continued)

*Primary Examiner* — Masum Billah
(74) *Attorney, Agent, or Firm* — Joseph Kolodka

(57) ABSTRACT

Methods and systems for predicting a trajectory include determining prediction samples for agents in a scene based on a past trajectory. The prediction samples are ranked according to a likelihood score that incorporates interactions between agents and semantic scene context. The prediction samples are iteratively refined using a regression function that accumulates scene context and agent interactions across iterations. A response activity is triggered when the prediction samples satisfy a predetermined condition.

18 Claims, 6 Drawing Sheets

(56) References Cited

OTHER PUBLICATIONS

Chelsea Finn et al., Guided Cost Learning: Deep Inverse Optimal Control via Policy Optimization, Proceedings of the 33 rd International Conference on Machine Learning, New York, NY, May 2016.
Diederik P. Kingma et al., Semi-supervised Learning with Deep Generative Models, Advances in Neural Information Processing Systems 27, Oct. 2014.
Kris Katani et al., Activity Forecasting, Proceedings of European Conference on Computer Vision, Aug. 2012.
Pieter Abbeel et al., Apprenticeship Learning via Inverse Reinforcement Learning, Proceedings of the 21 st International Conference on Machine Learning, Banff, Canada, Jul. 2004.

\* cited by examiner

DYNAMIC SCENE PREDICTION WITH MULTIPLE INTERACTING AGENTS

RELATED APPLICATION INFORMATION

This application claims priority to U.S. Provisional Application Ser. Nos. 62/414,288, 62/418,442, and 62/422,086, filed on Oct. 28, 2016, Nov. 7, 2016, and Nov. 15, 2016 respectively, each of which is incorporated herein by reference herein its entirety.

BACKGROUND

Technical Field

The present invention relates to scene prediction and, more particularly, to the prediction of future events within a dynamic scene.

Description of the Related Art

The analysis of dynamic scenes (e.g., video feeds from security cameras or other changing scenes) may identify agents (such as, e.g., people or vehicles) and track their motion through the scene. The scene may include other elements (e.g., roads and crosswalks). Thus, in the example of monitoring a traffic scene, agents may be tracked across the scene elements.

SUMMARY

A method for predicting a trajectory includes determining prediction samples for agents in a scene based on a past trajectory. The prediction samples are ranked according to a likelihood score that incorporates interactions between agents and semantic scene context. The prediction samples are iteratively refined using a regression function that accumulates scene context and agent interactions across iterations. A response activity is triggered when the prediction samples satisfy a predetermined condition.

A system for predicting a trajectory includes a prediction sample module configured to determine prediction samples for agents in a scene based on a past trajectory. A ranking/refinement module includes a processor configured to rank the prediction samples according to a likelihood score that incorporates interactions between agents and semantic scene context and to iteratively refine the prediction samples using a regression function that accumulates scene context and agent interactions across iterations. A response module is configured to trigger a response activity when the prediction samples satisfy a predetermined condition.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles predict behavior of agents in a dynamic scene. In particular, the present embodiments predict the locations of agents and the evolution of scene elements at future times using observations of the past states of the scene, for example in the form of agent trajectories and scene context derived from image-based features or other sensory date (if available).

The present embodiments thus adapt decision-making to make determinations about object and scene element types using image features. This stands in contrast to sensors like radar, which cannot generally resolve such features. The present embodiments furthermore handle the complex interactions between agents and scene elements in a scalable manner and account for the changes in behavior undertaken by agents in response to, or in anticipation of, the behavior of other agents.

To this end, the present embodiments formulate the prediction as an optimization that maximizes the potential future reward of the prediction. Because it is challenging to directly optimize the prediction, the present embodiments generate a diverse set of hypothetical predictions and ranks and refines those hypothetical predictions in an iterative fashion.

Figure 1:
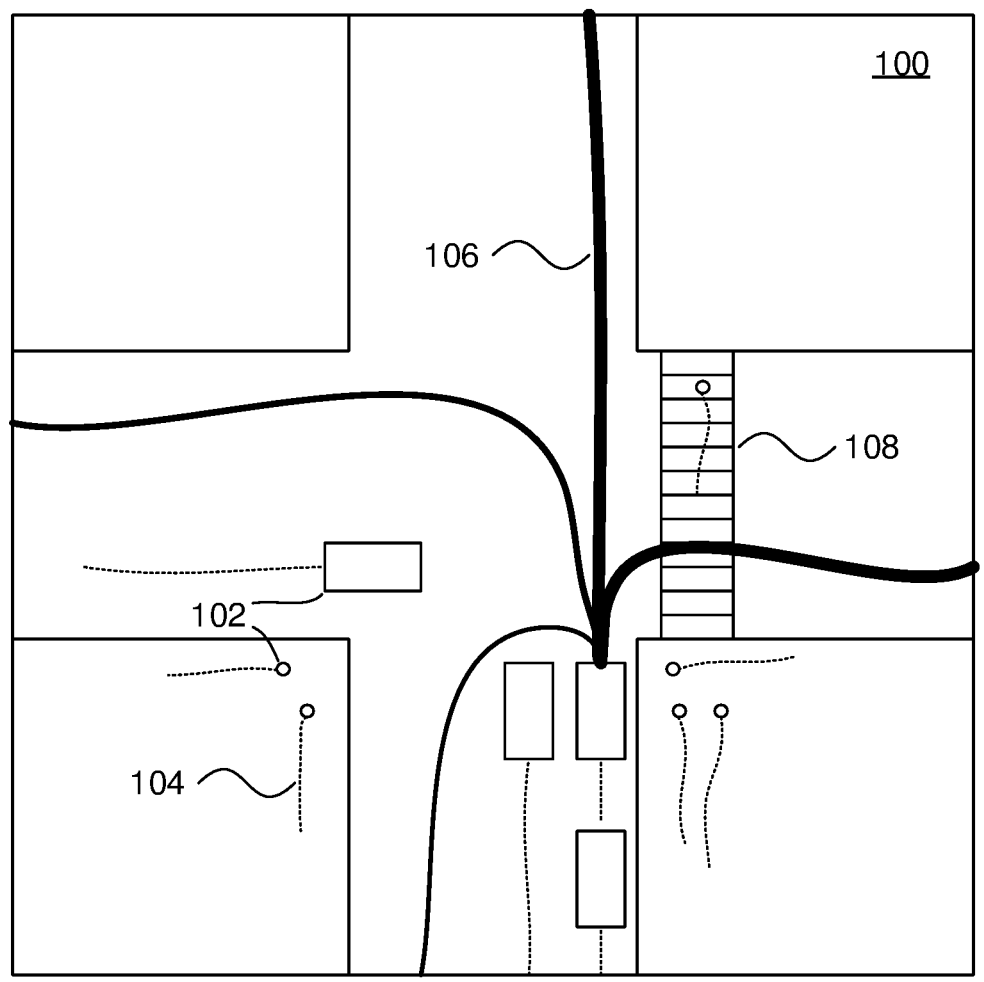
FIG. 1 is a drawing illustrating a set of past trajectories and a set of predicted trajectories for agents on a background in accordance with an embodiment of the present invention.

Referring now to FIG. 1, an exemplary scene 100 is shown. The scene 100 depicts an intersection that is being monitored and includes a number of agents 102, which in this case may include both pedestrians and automobiles. The past positions of each agent are shown as dotted-line paths 104. Predictions as to an agent's future position are shown as solid lines 106, with thicker lines representing predictions having a higher likelihood and thinner lines representing predictions having a lower likelihood. The scene 100 may be built across many individual images, with agent positions being tracked from image to image. Semantic elements such as, e.g., the crosswalk 108 may also be present and may include such features as lane markings, traffic lights, and road signs. These elements provide semantic scene context that is used to help determine likely agent trajectories.

Thus, the present embodiments provide the ability to predict behavior in monitored scenes, aiding in early warning of dangerous or criminal activities, predicting dangerous conditions, providing steering information for autonomous vehicles, etc. It should be understood that, although the present embodiments are described in the context of the specific application of traffic scene analysis, these embodiments may be applied to any future-prediction task. The present embodiments provide scalability (because deep learning enables end-to-end training and easy incorporation with multiple cues from past motion, scene context, and agent interactions), diversity (the stochastic output is combined with an encoding of past observations to generate multiple prediction hypotheses that resolve the ambiguities and multimodalities of future prediction), and accuracy (long-term future rewards are accumulated for sampled trajectories and a deformation of the trajectory is learned to provide accurate predictions farther into the future).

Figure 2:
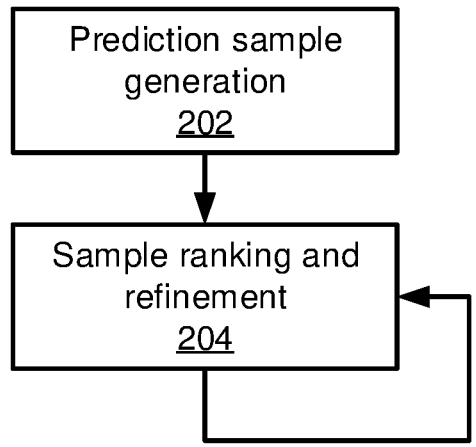
FIG. 2 is a block/flow diagram of a method of prediction generation and refinement in accordance with an embodiment of the present invention.

Referring now to FIG. 2, a method for trajectory prediction is shown. Since there can be multiple plausible futures given the same inputs (including images I and past trajectories X), block 202 generates a diverse set of prediction samples Ŷ to provide accurate prediction of future trajectories 106. Toward this end, block 202 employs a conditional variational auto-encoder (CVAE) framework to learn the sampling model. CVAE introduces a latent variable z that accounts for ambiguity in predictions of the future. A recurrent neural network (RNN) is used to produce an encoding h from the inputs that, with z, is passed to another RNN that generates the future prediction samples.

RNNs are generalizations of feedforward neural networks to sequences. The power of RNNs for sequence-to-sequence modeling makes them useful to the generation of sequential future prediction outputs. The RNNs discussed herein use gated recurrent units (GRUs) over long short-term memory (LSTM) units, since the former is simple but yield no degradation in performance. Contrary to existing RNN models, the present embodiments can predict trajectories of variable length.

Block 204 then determines the random prediction samples that are most likely to reflect future trajectories while incorporating scene context and interactions. Block 204 ranks the samples and refines them to incorporate contextual and interaction cues. Block 204 uses an RNN that is augmented with a fusion layer that incorporates interaction between agents and a convolutional neural network (CNN) that provides scene information. Block 204 uses training in a multi-task learning framework where the ranking objective is formulated using inverse optimal control (IOC) and the refinement objective is obtained by regression. In a testing phase, the ranking/refinement of block 204 is iterated to obtain more accurate refinements of the prediction of future trajectories.

Figure 3:
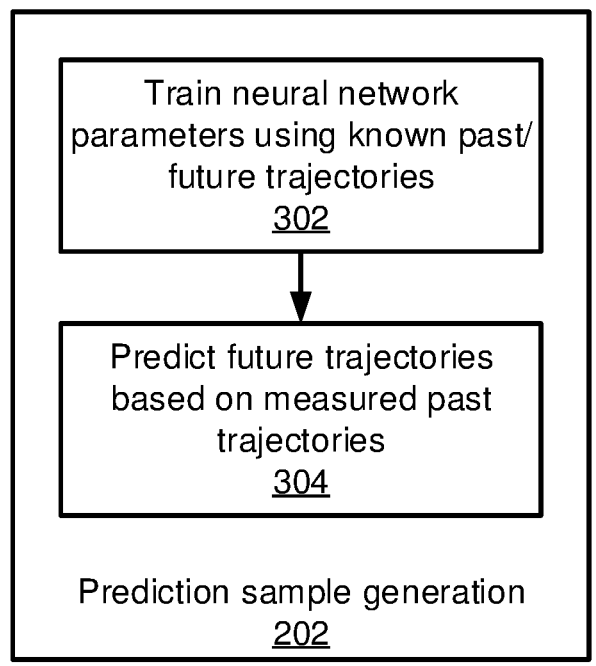
FIG. 3 is a block/flow diagram of a method of generating trajectory prediction samples in accordance with an embodiment of the present invention.

Referring now to FIG. 3, additional detail is provided regarding the generation of prediction samples in block 202. In particular, block 302 conducts a training phase, while block 304 conducts a testing phase. The training phase of block 302 uses a set of known past trajectories for n agents, $X=\{X_1, X_2, \ldots, X_n\}$, and a set of known future trajectories for the n agents, $Y=\{Y_1, Y_2, \ldots, Y_n\}$, from a set of training data and a set of sensory inputs (e.g., images from a video), $\mathcal{I}$. The future trajectory of an agent i is thus denoted as $Y_i=\{y_{i,t+1}, y_{i,t+2}, \ldots, y_{i,t+\delta}\}$, with t representing a present time and δ representing a limit to the amount of time into the future into which the prediction extends. The past trajectory for the agent i is similarly denoted as $X_i=\{x_{i,t-\iota+1}, x_{i,t-\iota+2}, \ldots, x_{i,t}\}$, with ι representing a limit to the amount of time into the past into which a recorded trajectory extends. The terms $x_{i,t}$ and $y_{i,t}$ each represent two-dimensional coordinates for position of the agent i within an image $\mathcal{I}_t$ captured at time t.

Future prediction is inherently ambiguous, with uncertainties as to which of several plausible scenarios will result from a given trajectory. Following the example of FIG. 1, a vehicle may make any of a variety of turns at an intersection. As a result, learning a deterministic function f that directly maps $\{X, \mathcal{I}\}$ to Y will under-represent the potential prediction space and can easily over-fit to training data. Furthermore, a naively trained network with a simple loss will product outcomes that average out all possible outcomes.

The present embodiments therefore create a deep generative model (CVAE). CVAE can learn the distribution $P(Y_i|X_i)$ of the output Y conditioned on the input trajectories $X_i$ by introducing a stochastic latent variable $z_i$. CVAE uses multiple neural networks, including a recognition network $Q_\phi(z_i|Y_i,X_i)$, a prior network $P_\nu(z_i|X_i)$, and a generation network $P_\theta(Y_i|X_i,z_i)$, where θ, ϕ, and ν denote parameters of each network.

The prior of the latent variables $z_i$ is modulated by the input $X_i$, but this can be relaxed to make the latent variables statistically independent of the input variables such that, e.g., $P_\nu(z_i|X_i)=P_\nu(z_i)$. CVAE essentially introduces stochastic latent variables $z_i$ that are learned to encode a diverse set of predictions $Y_i$ given the input $X_i$, making it suitable for modeling the one-to-many mapping of predicting future trajectories.

During training, block 302 learns $Q_\phi(z_i|Y_i,X_i)$ such that the recognition network gives higher probability to values of $z_i$ that are likely to produce a reconstruction $\hat{Y}_i$ that is close to actual predictions given the full context of training data for a given $X_i$ and $Y_i$. At test time, block 304 samples $z_i$ randomly from the prior distribution and decodes the latent variables through a decoder network to form a prediction hypothesis. This provides a probabilistic inference which serves to handle multi-modalities in the prediction space.

Block 302 encodes the training data, including a past trajectory $X_i$ and a future $Y_i$ for an agent i using respective RNNs with separate sets of parameters. Encoding the training data converts the image to a vector representation. The resulting encodings, $\mathcal{H}_{X_i}$ and $\mathcal{H}_{Y_i}$ are concatenated and processed by a fully connected neural network layer with a non-linear activation. Two side-by-side, fully connected layers are followed to produce both the mean $\mu_{z_i}$ and the standard deviation $\sigma_{z_i}$ over $z_i$. The distribution of $z_i$ is modeled as a Gaussian distribution (e.g., $z_i \sim Q_\phi(z_i|X_i,Y_i) = \mathcal{N}(\mu_{z_i},\sigma_{z_i})$) and is regularized by the Kullback-Leibler divergence against a prior distribution $P_\nu(z_i) = \mathcal{N}(0,I)$, where I is the identity matrix and $\mathcal{N}(0,I)$ is a normal distribution with zero mean and unit variance, during training. The fully connected layers convert the set of convolutional feature maps to a vector representation, allowing the network to reason over the entire image, rather than a local receptive field used by the convolutional layers.

Upon successful training, the target distribution is learned in the latent variable $z_i$, which provides random samples from a Gaussian distribution for the reconstruction of $Y_i$ in block 304. Since back-propagation is not possible through random sampling, reparameterization is used to make the model differentiable.

To model $P_\theta(Y_i|X_i,z_i)$, $z_i$ is combined with $X_i$ as follows. The sampled latent variable $z_i$ is passed to one fully connected layer to match the dimension of $\mathcal{H}_{X_i}$ that is followed by a softmax layer, producing $\beta(z_i)$. The softmaxed latent variable $\beta(z_i)$ is combined with the encodings of past trajectories $\mathcal{H}_{X_i}$ through a masking operation ⊠, such as element-wise multiplication. This can be interpreted as a guided drop out, where the guidance β is derived from the full context of individual trajectories during the training phase, while it is randomly drawn from an $X_i$- and $Y_i$-agnostic distribution in the testing phase of block 304. An RNN decoder takes the output of the previous step, $\mathcal{H}_{X_i} \boxtimes \beta(z_i)$, and generates K future prediction samples for each agent i: $\hat{Y}_i^{(1)}, \hat{Y}_i^{(2)}, \ldots, \hat{Y}_i^{(K)}$.

There are two loss terms in training the CVAR-based RNN encoder/decoder in block 302. A reconstruction loss is defined as $$\ell_{Recon} = \frac{1}{K} \sum_k \|Y_i - \hat{Y}_j^{(K)}\|.$$

The reconstruction loss measures how far the generated samples are from the actual ground truth. A Kullback-Leibler divergence loss is defined as $l_{KLD} = D_{\mathcal{KL}}(Q_\phi(z_i|Y_i,X_i) \| P(z_i))$. The Kullback-Leibler divergence loss measures how close the sampling distribution at test-time is to the distribution of the latent variable learned during training (e.g., approximate inference).

At test time, block 304 does not have access to encodings of future trajectories, so the encodings of past trajectories $\mathcal{H}_{X_i}$, drawn from recent data, are combined with multiple random samples of latent variable $z_i$ drawn from the prior $P_v(z_i)$. As in the training phase, $\mathcal{H}_{X_i} \boxtimes \beta(z_i)$ is passed to the following RNN decoder to generate a diverse set of prediction hypotheses. For both of blocks 302 and 04, trajectories pass through a temporal convolution layer before encoding to encourage the network to learn the concept of velocity from adjacent frames before getting passed into RNN encoders. RNNs are implemented using, e.g., gate recurrent units to learn long-term dependencies, but they can be replaced with any appropriate RNN, such as long short-term memory units.

Figure 4:
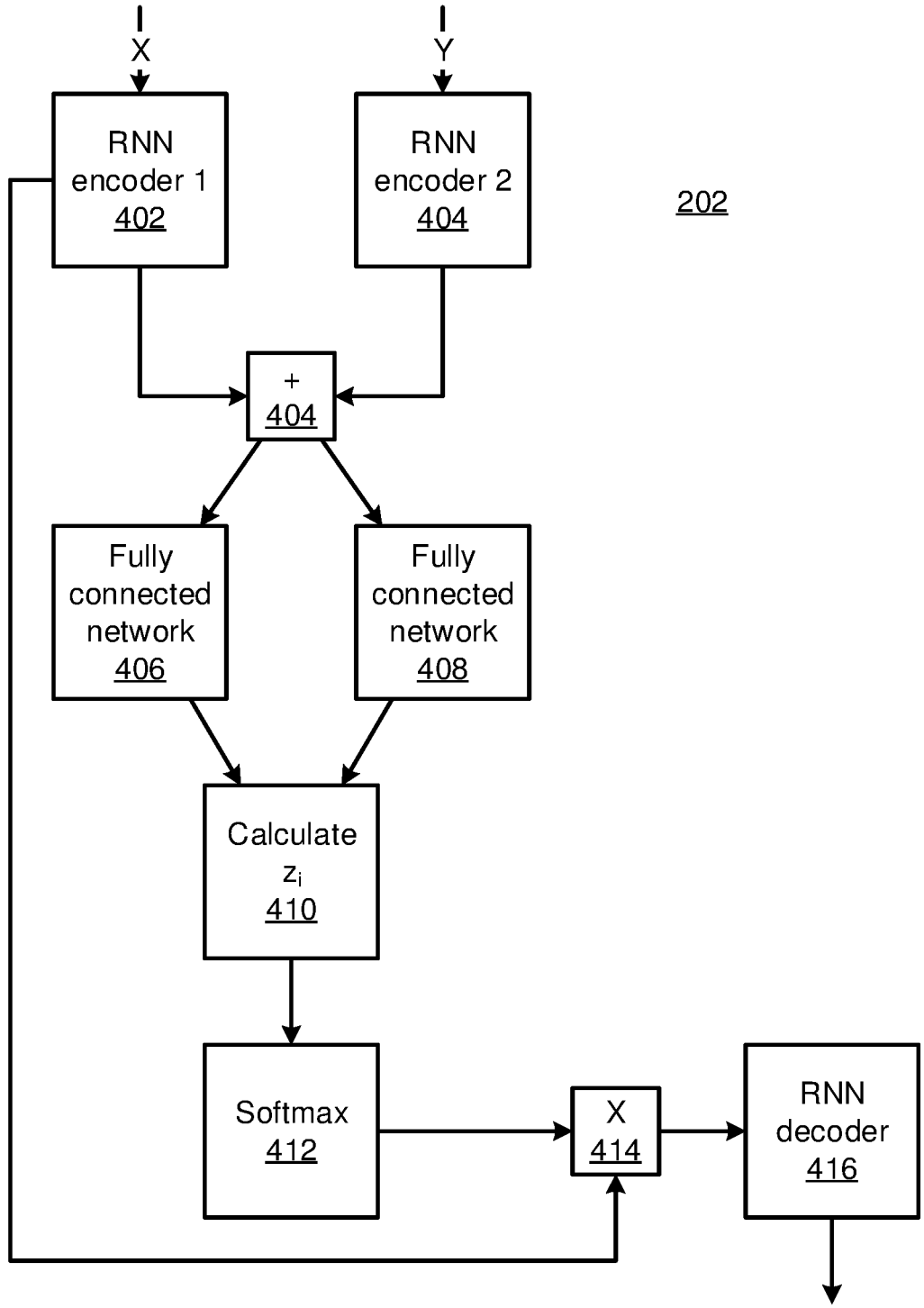
FIG. 4 is a block diagram of a system for generating trajectory prediction samples in accordance with an embodiment of the present invention.

Referring now to FIG. 4, a system-oriented view of prediction sample generation block 202 is shown. First RNN encoder 402 and second RNN encoder 404 accept inputs of X and Y respectively. The encoded inputs are then concatenated at block 404, with the concatenated input being sent to two fully connected networks. A first fully connected network 406 determines the mean, while the second fully connected network 408 determines the standard deviation. These two quantities are then used to determine the latent variable $z_i$.

Block 412 performs a softmax operation on the latent variable which is then combined with the encoded X input with the operation $\boxtimes$ at block 414. An RNN decoder 416 then decodes the output of block 414 to produce a predicted future trajectory $\hat{Y}$.

Predicting a distant future trajectory can be significantly more challenging than predicting a trajectory into the near future. Reinforcement learning, where an agent is trained to choose its actions to maximize long-term rewards to achieve a goal, is used to help determine likelier trajectories. The present embodiments learn an unknown reward function with an RNN model that assigns rewards to each prediction hypothesis $\hat{Y}_i^{(k)}$ and attaches a score $s_i^{(k)}$ based on the accumulated long-term rewards. Block 204 further refines the prediction hypotheses by learning displacements $\Delta \hat{Y}_i^{(k)}$ to the actual prediction through a fully connected layer.

Block 204 receives iterative feedback from regressed predictions and makes adjustments to produce increasingly accurate predictions. During the iterative refinement, past motion history through the embedding vector $\mathcal{H}_{X}$, semantic scene context through a CNN with parameters $\rho$, and interaction among multiple agents using interaction features are combined.

The score s of an individual prediction hypothesis $\hat{Y}_i^{(k)}$ for an agent i on a $k^{th}$ sample is defined as:

$$s(\hat{Y}_i^{(K)}; \mathcal{J}, X, \hat{Y}_{j\backslash i}^\forall) = \sum_{t=1}^T \psi(\hat{y}_{i,t}^{(K)}; \mathcal{J}, X, \hat{Y}_{\tau<t}^\forall)$$

where $\hat{Y}_{j\backslash i}^\forall$ is the prediction samples of agents other than agent I, $\hat{y}_{i,t}^{(k)}$ is the $k^{th}$ prediction sample of an agent i at time t, $\hat{Y}_{\tau<t}^\forall$ is the prediction samples before a time-step t, T is the maximum prediction length, and $\psi(\bullet)$ is a reward function that assigns a reward value at each time-step. The reward function $\psi(\bullet)$ may be implemented as a fully connected layer that is connected to the hidden vector at t of the RNN module.

The parameters of the fully connected layer are shared over all the time steps, such that the score s includes accumulated rewards over time, accounting for the entire future rewards being assigned to each hypothesis. The reward function $\psi(\bullet)$ includes both scene context $\mathcal{J}$ as well as the interaction between agents through the past trajectories.

Block 204 estimates a regression vector $\Delta \hat{Y}_i^{(k)}$ that refines each prediction sample $\hat{Y}_i^{(k)}$. The regression vector for each agent I is obtained with a regression function $\eta$ defined as follows:

$$\Delta \hat{Y}_i^{(k)} = \eta(\hat{Y}_i^{(k)}; \mathcal{J}, X, \hat{Y}_{j\backslash i}^\forall)$$

Represented as parameters of a neural network, the regression function $\eta$ accumulates both scene contexts and all other agent dynamics from the past to entire future frames and estimates the best displacement vector $\Delta Y_i^{(k)}$ over the entire time horizon T. Similar to the score s, it accounts for what happens in the future both in terms of scene context and interactions among dynamic agents to produce an output. The regression function $\eta$ is implemented as a fully connected layer that is connected to the last hidden vector of the RNN, which outputs an M×T dimensional vector, with M=2 being the dimension of the location state.

There are two loss terms in ranking and refinement block 204: a cross-entropy loss and a regression loss. The cross-entropy loss is expressed as $l_{CE} = H(p,q)$, where a target distribution q is obtained by softmax($-d(Y_i, \hat{Y}_i^{(k)})$) and where $d(Y_i, \hat{Y}_i^{(k)}) = \max\|\hat{Y}_i^{(k)} - Y_i\|$. The regression loss is expressed as $$\ell_{Reg} = \frac{1}{K} \sum_k \|Y_i - \hat{Y}_i^{(K)} - \Delta \hat{Y}_i^{(k)}\|.$$

The total loss of the entire network is defined as a multi-task loss:

$$\ell_{Total} = \frac{1}{N} \sum_i \ell_{Recom} + \ell_{KLD} + \ell_{CE} + \ell_{Reg},$$

where N is the total number of agents in a batch.

Figure 5:
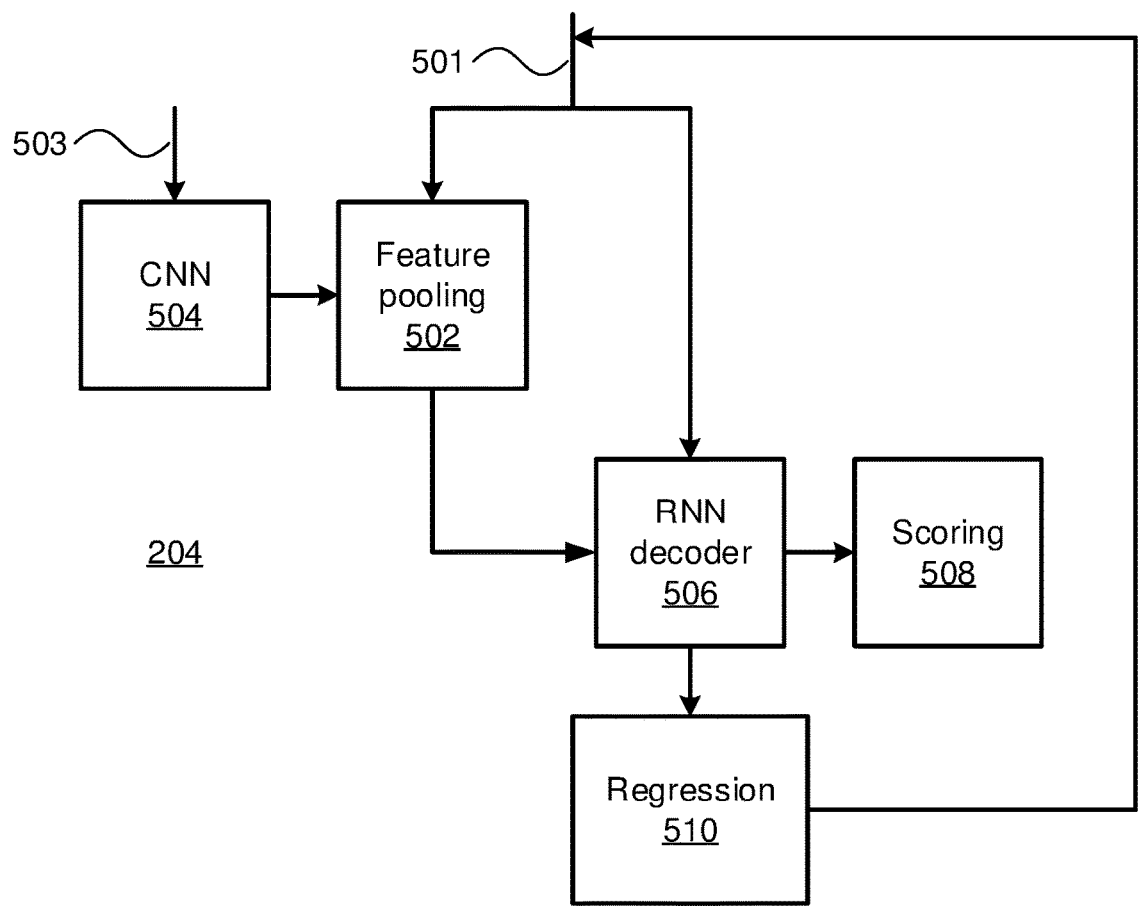
FIG. 5 is a block diagram of a system for predicting future trajectories based on measured past trajectories in accordance with an embodiment of the present invention.

Referring now to FIG. 5, a system-oriented view of prediction sample generation block 204 is shown. The prediction samples 501 generated by block 202 are provided as input to a feature pooling block 502 and to an RNN decoder 506. A CNN 504 also takes raw input (before processing by the sample generation of block 202) for semantic scene context processing, providing its output to feature pooling block 502, which combines local entries of a feature map into a more compact representation, allowing the feature map to be invariant to local transformations and/or aggregate information over wider spatial regions. The CNN 504 takes the raw image input and produces semantic segmentation output, where each pixel in the image is labeled by its category (e.g., "sky," "road," "building," "pedestrian," "car," etc.). This makes it possible to incorporate semantic scene information into predictions.

The feature pooling block 502 provides its output to the RNN decoder 506, which processes the feature pooling output and the prediction samples, providing its output to scoring block 508, which scores the samples and tracks accumulated rewards, and to regression block 510, which provides the regression vector $\Delta \hat{Y}_i^{(k)}$ as feedback that is combined with input 501 for the next iteration.

The RNN decoder 506 in the ranking and refinement block 204 makes use of information about the past motion context of individual agents, the semantic scene context, and the interaction between multiple agents to provide hidden representations that can score and refine the prediction $\hat{Y}_i^{(k)}$. The RNN decoder 506 therefore takes as input:

$$x_i = [\gamma(\hat{y}_{i,t}, p(\hat{y}_{i,t}; \rho(\mathcal{I})), r(\hat{y}_{i,t}; \hat{y}_{j,t}, h_{\hat{y}_{j,t}})]$$

where $\hat{\dot{y}}_{i,t}$ is a velocity of $\hat{Y}_i^{(k)}$ at a time t, $\gamma$ is a fully connected layer with an activation that maps the velocity to a high-dimensional representation space, $p(\hat{y}_{i,t}; \rho(\mathcal{I}))$ is a pooling operation that pools the CNN feature $\rho(\mathcal{I})$ at the location $\hat{y}_{i,t}$, and $r(\hat{y}_{i,t}; \hat{y}_{j,t}, h_{\hat{y}_{j,t}})$ is an interaction feature computed by a fusion layer that spatially aggregates other agents' hidden vectors. The embedding vector $\mathcal{H}_{X_i}$ (output by the first RNN encoder 402 in the sample generation block 202) is shared as the initial hidden state of the RNN decoder 506 of the ranking and refinement block 204 to provide individual past motion context. This embedding is shared since both involve embedding the same information in the vector.

The feature pooling block 502 implements a spatial grid. For each sample k of an agent i at time t, spatial grid cells are defined centered at $\hat{y}_{i,t}^{(k)}$. Over each grid cell g, the hidden representation of all the other agents' samples that are within the spatial cell are pooled, $\forall j \neq i$, $\forall k$, $\hat{y}_{j,t}^{(k)} \in g$. Average pooling and a log-polar grid may be used to define the spatial grid.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
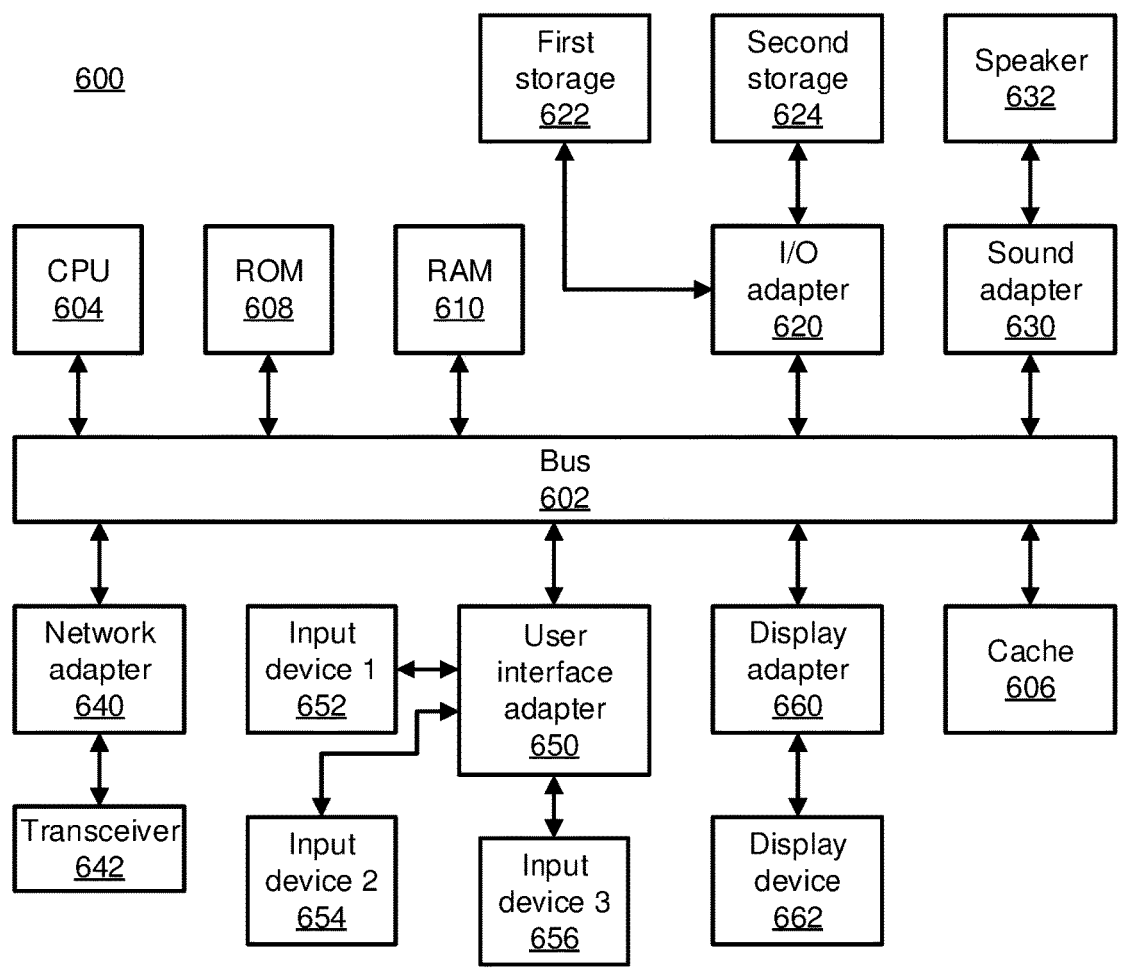
FIG. 6 is a block diagram of a processing system in accordance with an embodiment of the present invention.

Referring now to FIG. 6, an exemplary processing system 600 is shown which may represent the prediction sample generating system 202 and/or the sample ranking and refinement system 204. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
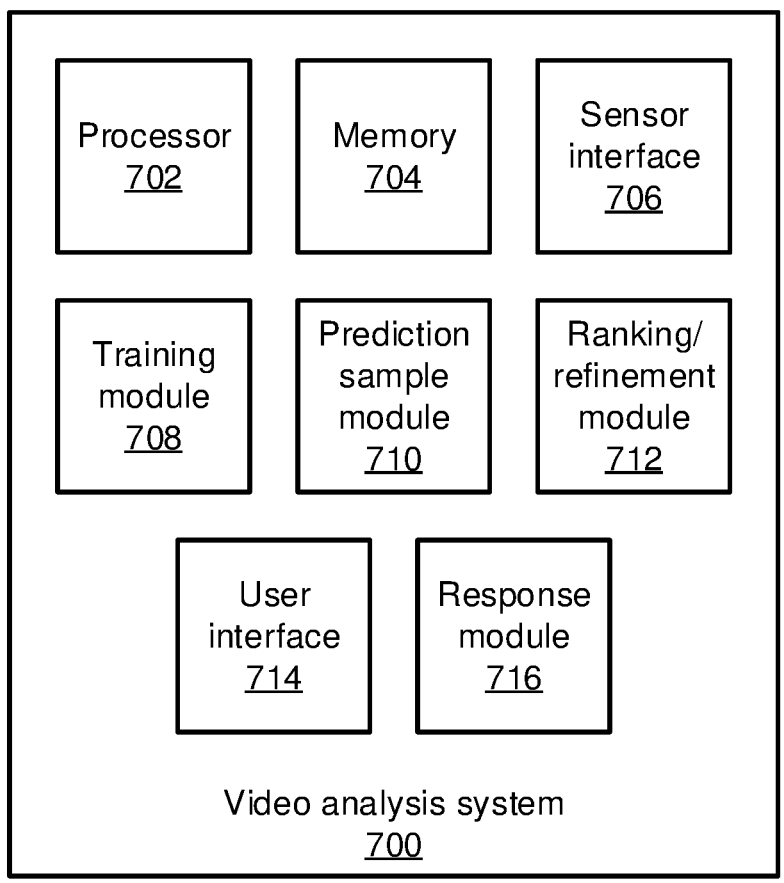
FIG. 7 is a block diagram of a video analysis system in accordance with an embodiment of the present invention.

Referring now to FIG. 7, a video analysis system 700 is shown. The system 700 includes a hardware processor 702 and memory 704. A sensor interface 706 collects data from one or more sensors (e.g., video feeds from cameras or any other appropriate sensor type) and stores the data in memory 704. The system 700 furthermore includes one or more functional modules that, in some embodiments, may be implemented as software that is stored in memory 704 or, in other embodiments, may be implemented as one or more discrete hardware components in the form of, e.g., application specific integrated chips or field programmable gate arrays.

A training module 708 provides training for neural networks in prediction sample module 710 according to a set of input data that may be stored in the memory 704. The training module 708 uses previous examples of agent trajectories, using the known future trajectories from a particular point in time to train predictions based on a past trajectory. After training, the prediction sample module 710 generates sets of such predictions for the ranking/refinement module 712 to work with, ultimately producing one or more predictions that represent the most likely future trajectories for agents, taking into account the presence and likely actions of other agents in the scene.

A user interface 714 is implemented to provide a display that shows the future trajectories as an overlay of a most recent piece of sensor data, for example overlaying the most likely trajectory of agents in the field of view of a camera. A response module 716 provides manual or automated actions responsive to the determined trajectories, where a human operator can trigger a response through the user interface 714 or a response can be triggered automatically in response to the trajectories matching certain conditions. For example, a large number of agents being detected at a crosswalk, with likely trajectories of crossing the street, may trigger a change in a lighting system's pattern to provide a "walk" signal to those agents. In another embodiment, the response module 716 may recognize that an agent is likely to enter an area that is dangerous or off-limits, and the response module 716 may then raise an alarm or trigger a barrier to the user's progress (e.g., by locking a door).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for predicting a trajectory, comprising:
determining a plurality of prediction samples for each agent in a plurality of agents in a scene based on a past trajectory;
ranking the prediction samples using a processor according to a likelihood score that incorporates interactions between agents and semantic scene context;
iteratively refining the prediction samples using a regression function that accumulates scene context and agent interactions across iterations, wherein the regression function is defined as:

$$\eta(\hat{Y}_i^{(k)}; \mathcal{I}, X, \hat{Y}_{j\backslash i}^{\forall})$$

where $\hat{Y}_i^{(k)}$ is an $i^{th}$ prediction sample, $\mathcal{I}$ is a scene context, X is a set of known past trajectories for the plurality of agents, and $\hat{Y}_{j\backslash i}^{\forall}$ is the prediction samples of agents other than an agent I; and
triggering a response activity when the prediction samples satisfy a predetermined condition.

2. The method of claim 1, further comprising training a neural network used to generate the prediction samples based on past trajectories and outcomes of the past trajectories.

3. The method of claim 2, wherein training the neural network comprises determining stochastic latent variables that characterize a distribution of prediction samples.

4. The method of claim 3, wherein determining the plurality of prediction samples comprises randomly generating predictions within parameters set by the stochastic latent variables.

5. The method of claim 3, wherein a distribution of the stochastic latent variables comprises a Gaussian distribution defined by a mean and a standard deviation, regularized by a Kullback-Leibler divergence over a distribution of the past trajectories and the outcomes of the past trajectories.

6. The method of claim 1, wherein the agent interactions are characterized by all past trajectories, including trajectories from training data and trajectories in a present scene.

7. The method of claim 1, wherein the scene context is characterized by static features of a scene that influence agent behavior.

8. The method of claim 1, wherein the scene is a video feed and wherein agents are moving entities within the scene.

9. The method of claim 1, wherein the response activity comprises an activity selected from the group consisting of raising an alarm and enabling a barrier to a user's trajectory.

10. A system for predicting a trajectory, comprising:
a prediction sample module configured to determine a plurality of prediction samples for each agent in a plurality of agents in a scene based on a past trajectory;
a ranking/refinement module comprising a processor configured to rank the prediction samples according to a likelihood score that incorporates interactions between agents and semantic scene context and to iteratively refine the prediction samples using a regression function that accumulates scene context and agent interactions across iterations, wherein the regression function is defined as:

$$\eta(\hat{Y}_i^{(k)}; \mathcal{I}, X, \hat{Y}_{j\backslash i}^{\forall})$$

where $\hat{Y}_i^{(k)}$ is an $i^{th}$ prediction sample, $\mathcal{I}$ is a scene context, X is a set of known past trajectories for the plurality of agents, and $\hat{Y}_{j\setminus i}^{\forall}$ is the prediction samples of agents other than an agent I; and a response module configured to trigger a response activity when the prediction samples satisfy a predetermined condition.

11. The system of claim 10, further comprising a training module configured to train a neural network used to generate the prediction samples based on past trajectories and outcomes of the past trajectories.

12. The system of claim 11, wherein the training module is further configured to determine stochastic latent variables that characterize a distribution of prediction samples.

13. The system of claim 12, wherein the prediction sample module is further configured to randomly generate predictions within parameters set by the stochastic latent variables.

14. The system of claim 12, wherein a distribution of the stochastic latent variables comprises a Gaussian distribution defined by a mean and a standard deviation, regularized by a Kullback-Leibler divergence over a distribution of the past trajectories and the outcomes of the past trajectories.

15. The system of claim 11, wherein the agent interactions are characterized by all past trajectories, including trajectories from training data and trajectories in a present scene.

16. The system of claim 11, wherein the scene context is characterized by static features of a scene that influence agent behavior.

17. The system of claim 11, wherein the scene is a video feed and wherein agents are moving entities within the scene.

18. The system of claim 11, wherein the response activity comprises an activity selected from the group consisting of raising an alarm and enabling a barrier to a user's trajectory.

* * * * *